United States Patent
Manjunath et al.

(10) Patent No.: US 11,410,041 B2
(45) Date of Patent: Aug. 9, 2022

(54) METHOD AND DEVICE FOR DE-PREJUDICING ARTIFICIAL INTELLIGENCE BASED ANOMALY DETECTION

(71) Applicant: Wipro Limited, Bangalore (IN)

(72) Inventors: Shreya Manjunath, Bangalore (IN); Randeep Raghu, Bangalore (IN)

(73) Assignee: Wipro Limited, Bangalore (IN)

( * ) Notice: Subject to any disclaimer, the term of this patent is extended or adjusted under 35 U.S.C. 154(b) by 698 days.

(21) Appl. No.: 16/259,551

(22) Filed: Jan. 28, 2019

(65) Prior Publication Data
US 2020/0167653 A1 May 28, 2020

(30) Foreign Application Priority Data
Nov. 27, 2018 (IN) .............................. 201841044679

(51) Int. Cl.
*G06N 20/00* (2019.01)
*G06N 7/00* (2006.01)
*G06N 3/08* (2006.01)

(52) U.S. Cl.
CPC ............. *G06N 3/082* (2013.01); *G06N 7/005* (2013.01); *G06N 20/00* (2019.01)

(58) Field of Classification Search
CPC ......... G06N 3/082; G06N 20/00; G06N 7/005
See application file for complete search history.

(56) References Cited

U.S. PATENT DOCUMENTS

| 2017/0279830 A1* | 9/2017 | Mermoud | H04L 41/145 |
| 2020/0134493 A1* | 4/2020 | Bhide | G06N 5/048 |

OTHER PUBLICATIONS

Stumpf et al. "Toward Harnessing User Feedback for Machine Learning." IUI'07, Jan. 28-31, 2007, pp. 88-91 (Year: 2007).*
Liang, Percy, Michael I. Jordan, and Dan Klein. "Learning programs: A hierarchical Bayesian approach." Proceedings of the 27th International Conference on Machine Learning (ICML-10). 2010. 8 pages. (Year: 2010).*

(Continued)

*Primary Examiner* — Abdullah Al Kawsar
*Assistant Examiner* — Asher H. Jablon
(74) *Attorney, Agent, or Firm* — Finnegan, Henderson, Farabow, Garrett & Dunner, LLP (57) ABSTRACT

A method for de-prejudicing Artificial Intelligence (AI) based anomaly detection is disclosed. The method includes training and testing an AI model based on a labelled training data, determining whether the AI model reveals a bias, based on one or more prejudicing variables, and thereafter rebuilding the AI model based on iterative process of de-prejudicing the feature set of the AI model and de-prejudicing the training data. A check is made to determine whether the feature set of the AI model feature set includes any proxy variables associated with any of the prejudicing variables and identifies the weight to be assigned to a proxy variable based on the intra-cohort variation in separate machine learning models built for each cohort associated with each value of the prejudicing variable. The feature set of the AI model is de-prejudiced based on the explanatory power of the proxy variables independent of the prejudicing variables.

17 Claims, 5 Drawing Sheets

(56) References Cited

OTHER PUBLICATIONS

Mikolov et al. "Efficient Estimation of Word Representations in VectorSpace." Sep. 7, 2013. arXiv:1301.3781v3 [cs.CL], 12 pages (Year: 2013).*
Ross CT (2015) "A Multi-Level Bayesian Analysis of Racial Bias in Police Shootings at the County-Level in the United States, 2011-2014." PLoS ONE 10(11): e0141854. 34 pages. (Year: 2015).*
Bolukbasi et al. "Man is to Computer Programmer as Woman is to Homemaker? Debiasing Word Embeddings." Jul. 21, 2016. arXiv: 1607.06520v1 [cs.CL], 25 pages. (Year: 2016).*
Ribeiro et al. "'Why Should I Trust You?': Explaining the Predictions of Any Classifier." In Proceedings of the 22nd ACM SIGKDD International Conference on Knowledge Discovery and Data Mining (KDD '16). 2016. pp. 1135-1144. (Year: 2016).*
Peltola, Tomi. "Local Interpretable Model-agnostic Explanations of Bayesian Predictive Models via Kullback-Leibler Projections." Oct. 5, 2018. arXiv:1810.02678v1 [cs.LG]. 5 pages. (Year: 2018).*

* cited by examiner

METHOD AND DEVICE FOR DE-PREJUDICING ARTIFICIAL INTELLIGENCE BASED ANOMALY DETECTION

This application claims the benefit of Indian Patent Application Serial No. 201841044679, filed Nov. 27, 2018, which is hereby incorporated by reference in its entirety.

FIELD

This disclosure relates generally to Artificial Intelligence (AI) based anomaly detection and more particularly to method and device for de-prejudicing AI based anomaly detection.

BACKGROUND

AI models that are built to detect anomalies, may result in biased or prejudiced outcomes owing to the inherent bias in the training data that is used to build these AI models. Such AI models have the potential to reinforce existing human biases and spiral into self-reinforcing discriminatory systems because of their feedback loops. Self-learning anomaly detection systems that are based on machine learning algorithms using feedback loops, may end up making self-fulfilling prophecies. By way of an example, using an AI model to detect fraudulent insurance claims may result in greater scrutiny of target claims from a particular demographic group because of historical fraud rates. By virtue of more investigations of the target group, the investigators are likely to find more anomalies and provide this feedback to the AI model, thereby resulting in a self-reinforcing loop of machine bias.

The inherent bias in the training data may result in biased predictions based on prejudicing variables. Examples of the prejudicing variables may include, but are not limited to ethnicity, religion, gender, or sexual orientation. Removing these prejudicing variables will not de-prejudice the AI model. Merely masking or removing the prejudicing variables is insufficient to remove the inherent bias built into the AI model, as the training data may include proxy variables that are correlated to the prejudicing variables. For example, in some ghettoized cities, zip code may be proxy variable for ethnicity. Additionally, bias may be induced by the humans-in-the-loop who provide feedback to the AI model which will prejudice the decision of the AI model. As a result, implicit biases are re-enforced by the AI model due to feedback loops.

The AI models in some cases may be black boxes that lack transparency and explanations. This lack of transparency and explanations confounds ethical judgement on the results of the AI models and the procedural fairness of the AI based decision making.

SUMMARY

In one embodiment, a method for de-prejudicing Artificial Intelligence (AI) based anomaly detection is disclosed. The method includes training and testing by an anomaly detection device, an AI model, based on labelled training data. The method further includes determining, by the anomaly detection device, whether the AI model reveals a bias, based on one or more prejudicing variables. The method further includes determining, by the anomaly detection device, whether the feature set of the AI model includes one or more proxy variables associated with any of the prejudicing variables. The method includes building, by the anomaly detection device, AI cohort models for the plurality of cohorts associated with the values of each of the prejudicing variables. The method includes identifying, by the anomaly detection device, intra-cohort variation indicating behavioral differences among a plurality of cohorts. The method includes determining, by the anomaly detection device, based on the intra-cohort variation when the proxy variable has explanatory power independent of the prejudicing variable and the weight of the proxy variable independent of the prejudicing variable. The method includes de-prejudicing, by the anomaly detection device, the feature set of the AI model based on the explanatory power of the proxy variables independent of the prejudicing variables. The method includes de-prejudicing the training data, by the anomaly detection device, of any residual bias after de-prejudicing the feature set through curation of the data set based on sampling techniques. The method includes using the de-prejudiced model to detect anomalies. The method further attributes a set of causal features to each anomalous prediction. Continuous feedback received by the device is de-prejudiced through the same method as described above using the feedback as additional training data for re-building the self-learning AI model.

In another embodiment, an anomaly detection device for de-prejudicing Artificial Intelligence (AI) based anomaly detection is disclosed. The system includes a processor and a memory communicatively coupled to the processor, wherein the memory stores processor instructions, which, on execution, causes the processor to train and test an AI model, based on labelled training data. The processor instructions further cause the processor to determine whether the AI model reveals a bias, based on one or more prejudicing variables. The processor instructions further cause the processor to determine whether the feature set of the AI model includes one or more proxy variables associated with any of the prejudicing variables. The processor instructions cause the processor to build AI cohort models for the plurality of cohorts associated with the values of each of the prejudicing variables. The processor instructions cause the processor to identify intra-cohort variation indicating behavioral differences among a plurality of cohorts. The processor instructions cause the processor to determine based on the intra-cohort variation when the proxy variable has explanatory power independent of the prejudicing variable and the weight of the proxy variable independent of the prejudicing variable. The processor instructions cause the processor to de-prejudice the feature set of the AI model based on explanatory power of the proxy variables independent of the prejudicing variables. The processor instructions further cause the processor to de-prejudice the training data, by the anomaly detection device, of any residual bias after de-prejudicing the feature set through curation of the data set based on sampling techniques. The processor instructions cause the processor to use the de-prejudiced model to detect anomalies. The processor instructions further cause the processor to attribute a set of causal features to each anomalous prediction. The processor instructions cause the processor that receives the continuous feedback to de-prejudice the feedback through the same method as described above using the feedback as additional training data for re-building the self-learning AI model.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
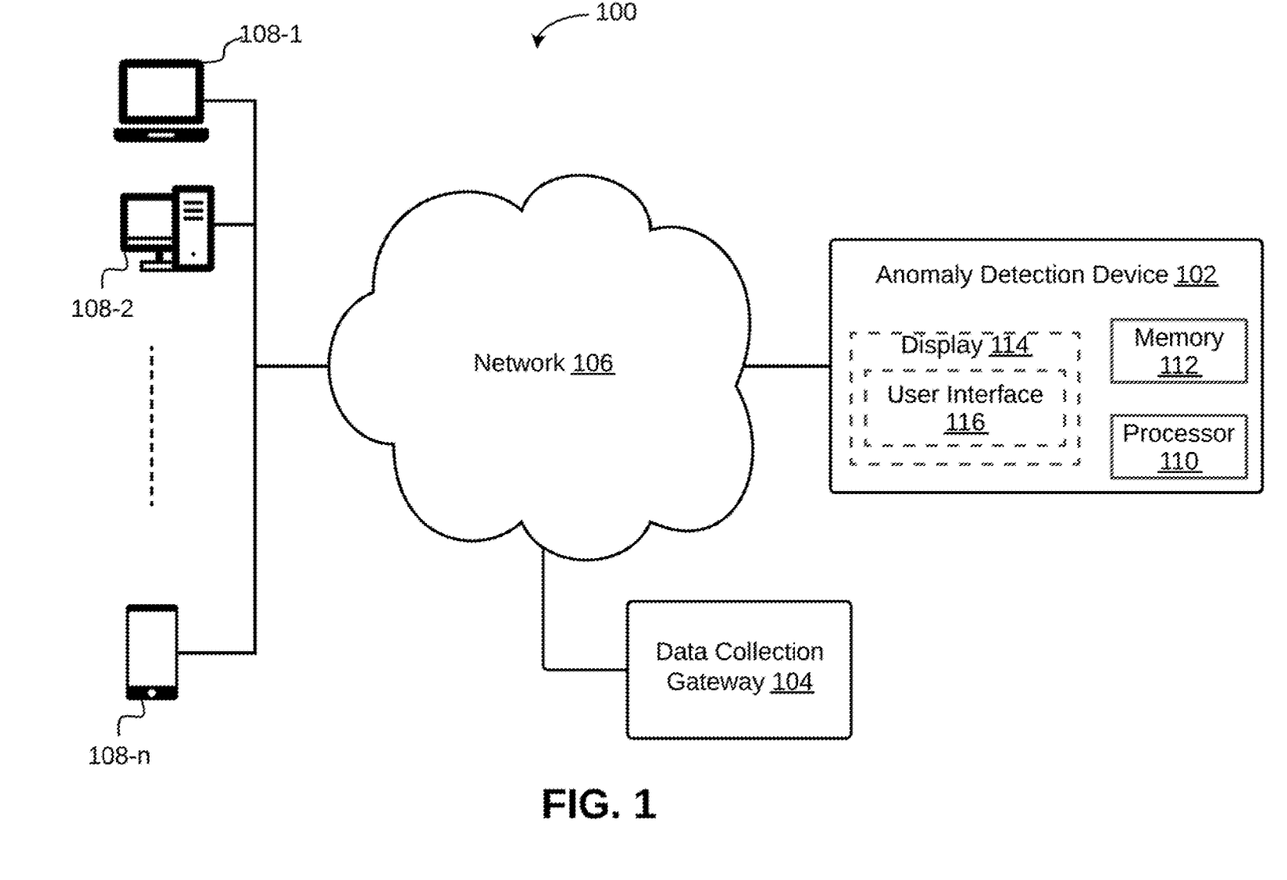
FIG. 1 illustrates a system for de-prejudicing Artificial Intelligence (AI) based anomaly detection, in accordance with an embodiment.

Additional illustrative embodiments are listed below. In one embodiment, a system 100 for de-prejudicing Artificial Intelligence (AI) based anomaly detection is illustrated in FIG. 1. The system 100 includes an anomaly detection device 102 that is configured to de-prejudice AI based anomaly detection. In other words, the anomaly detection device 102 de-prejudices an AI model that is built to detect anomalies. The AI model, for example, may be used to automatically detect fraudulent insurance claims, or to automatically predict if a consumer is likely to default prior to granting the consumer a personal loan, housing loan, etc. The de-prejudicing may be performed by not merely removing prejudicing variables, such as, ethnicity, religion from the AI model, but by removing or reweighting proxy variables that are correlated to the prejudicing variables and result in biasing the AI model. The de-prejudicing may also be performed by curating the data used for training. Examples of the anomaly detection device 102 may include, but are not limited to an application server, a laptop, a desktop, an application server, a smart phone, or a tablet.

The anomaly detection device 102 may communicate with a data collection gateway 104 via a network 106. The network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS). The data collection gateway 104 may further communicate with computing devices 108-1 to 108-n (collectively referred to as a plurality of computing devices 108), via the network 106, in order to collate data from one or more of the plurality of computing device 108. The plurality of computing device 108 may individually be used to collect data from consumers. Alternatively, the data collection gateway 104 may communicate with a data repository (not shown in FIG. 1) that may include historic data collected from a plurality of consumers.

The data collected/collated by the data collection gateway 104 may be extracted by the anomaly detection device 102 to build and de-prejudice the AI model. To this end, the anomaly detection device 102 includes a processor 110 that is communicatively coupled to a memory 112, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM).

The memory 112 may further include various modules that enable the anomaly detection device 102 to de-prejudice the AI model. These modules are explained in detail in conjunction with FIG. 2. The anomaly detection device 102 may further include a display 114 having a User Interface (UI) 116 that may be used by a user or to provide various inputs to the anomaly detection device 102. The display 114 may further be used to display a result of the analysis performed by the anomaly detection device 102. The functionality of the anomaly detection device 102 may alternatively be configured as a distributed system, such that each module within the memory 112 may be implemented as a separate system.

Figure 2:
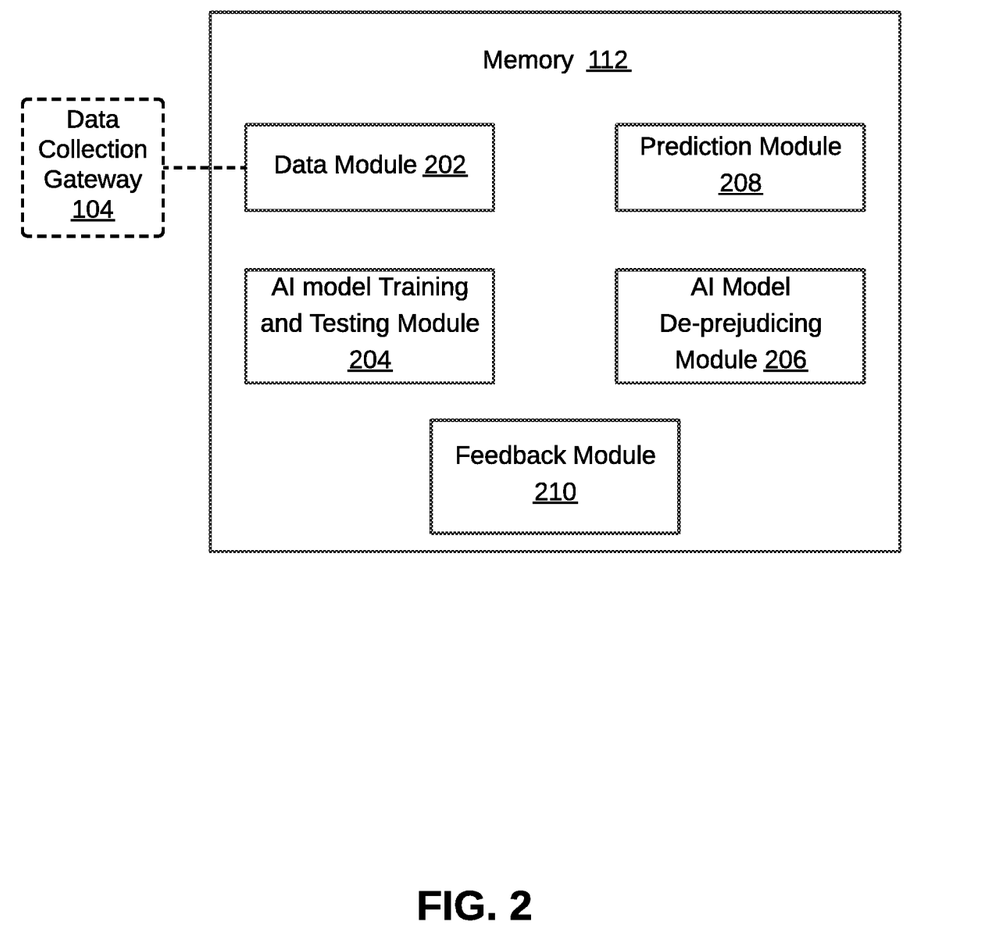
FIG. 2 is a block diagram illustrating various modules within a memory of an anomaly detection device configured to de-prejudice AI based anomaly detection, in accordance with an embodiment.

Referring now to FIG. 2, is a block diagram illustrating various modules within the memory 112 of the anomaly detection device 102 configured to de-prejudice AI based anomaly detection, in accordance with an embodiment. The memory 112 includes a data module 202, an AI model training and testing module 204, an AI model de-prejudicing module 206, a predicting module 208, and a feedback module 210.

The data module 202 is coupled to the data collection gateway 104 and ingests data from the data collection gateway 104 to the memory 112 of the anomaly detection device 102 in order to build an AI model. Based on the data, the data module 202 enables transformations and feature building defined according to the domain knowledge of the business process for which the AI model is being built. From the data retrieved from the data collection gateway 104 the following variables may be extracted: variables that may be used as a part of the AI model, prejudicing variables that are collected to de-bias the data in order to de-prejudice the AI model, variables that may not be used by the AI model, but by the human in the loop. Prejudicing variables may include, but are not limited to ethnicity, gender, or sexual orientation. However, when such information is not available, then the data is imputed by the data module 202 based on other variables including the name and sur-name of an individual.

The AI model training and testing module 204 includes machine learning models that are interpretable and explainable to enable scrutiny of the decisions. Explainable models include decision tree based models that address the class imbalance problem of anomaly detection such as RUS Boost (Random Under-sampling Boosting Technique) or SMOTE Boost ((Synthetic Minority Oversampling Technique) as well as non-decision tree based models such as naïve Bayes models. The AI training and testing module 204 trains the AI model on the data sets received from the data module 202. The AI model training and testing module 204 employs an iterative mechanism to select features and the trade-off between precision and recall. This is further explained in detail in conjunction with FIG. 3 and FIG. 4.

The AI model de-prejudicing module 206 uses the output obtained from the AI model training and testing module 204 to identify prejudice in the model, identify proxy variables associated with the prejudicing variables, build separate models in case of intra-cohort variation indicating behavioral differences based on the values of the prejudicing variables, remove or re-weight one or more of the proxy variables, and remove residual bias by curating the data set. The prediction unit 208 then predicts the output (i.e. Anomaly or non-anomaly) for new inputs after the de-prejudicing of the AI model has been performed. Additionally, the prediction unit 208 uses causal factor attribution to attribute reasons for prediction. The feedback module 210 accepts feedback on the predicted outcomes from the investigators and sends this feedback to the AI model training and testing module 204 to be used as additional training data. This is further explained in detail in conjunction with FIG. 3 and FIG. 4.

Figure 3:
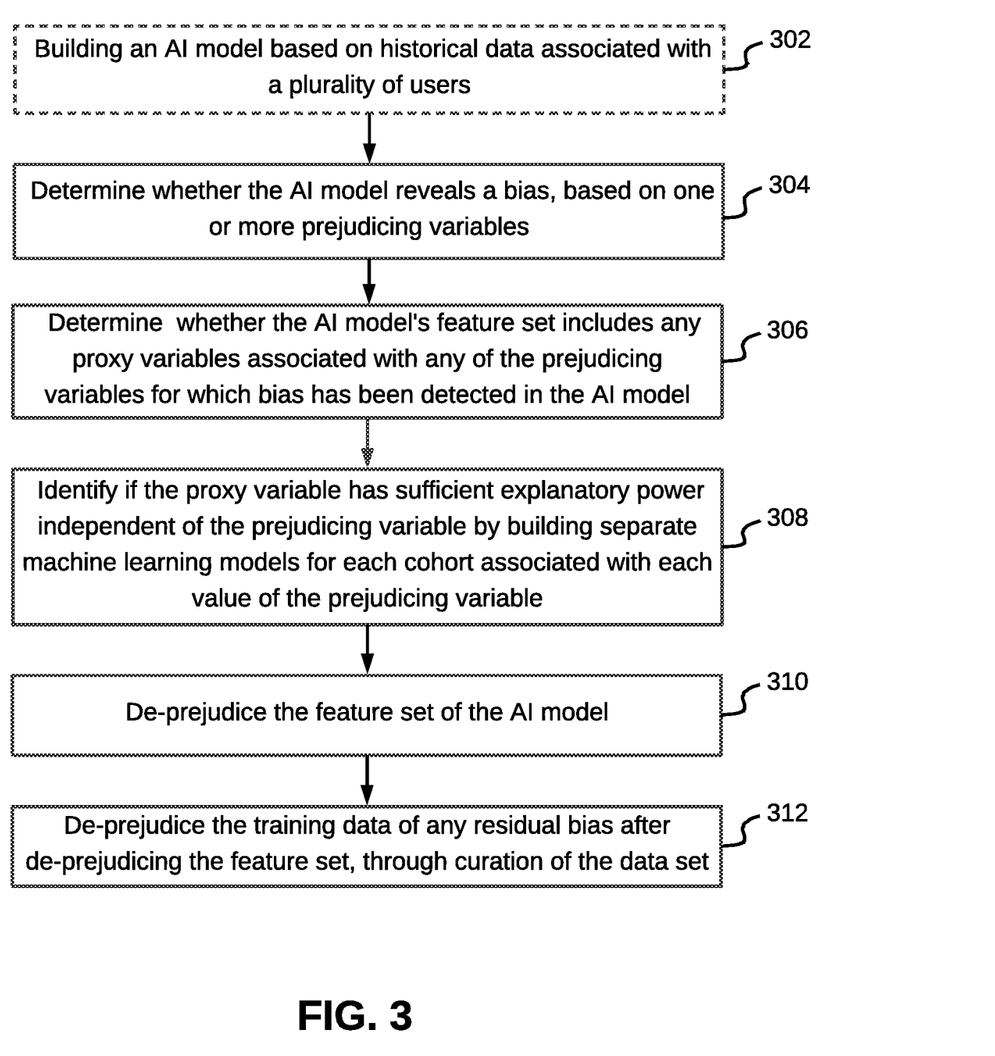
FIG. 3 illustrates a flowchart of a method for de-prejudicing AI based anomaly detection, in accordance with an embodiment.

Referring now to FIG. 3, a flowchart of a method for de-prejudicing AI based anomaly detection is illustrated, in accordance with an embodiment. At step 302, the anomaly detection device 102 builds an AI model. The AI model may be built based on historical data associated with a plurality of consumers. The historical data may be received through the data collection gateway 104. The AI model is built using training data that is labelled i.e. data for which the final outcome (anomaly or non-anomaly) is already known. Each relevant information of the training data is transformed into a feature within the AI model. By way of an example, if the AI model is built to determine whether a given individual has committed an insurance fraud or not, the AI model may include, but is not limited to the following features: injury type (fatalities or soft injuries or hard injuries), number of passengers, car type, license type, whether witnesses were present, whether salvage services was called, whether ambulance was called, whether the person was drunk or not, the insurance amount, the number of past claims submitted by the individual. Additionally, the training data is labelled and includes both anomalous and non-anomalous cases. By way of example, both fraudulent and non-fraudulent insurance claims are included in a model to detect insurance fraud. AI models that are built and used for prediction are stored for audit purposes.

The anomaly detection device 102, at step 304, determines whether the AI model reveals a bias based on one or more prejudicing variables. Examples of the one or more prejudicing variables may include, but are not limited to gender, ethnicity, religion, or sexual orientation. In an embodiment, a list of prejudicing variables may be prepared based on existing anti-discriminatory laws or based on the decision of ethics committees within the organization. By way of an example, based on the historic data used to train the AI model for predicting loan defaults, the AI model may end up rejecting loan applications made by people of certain ethnicity or religion even if these prejudicing variables are not included in the model. The bias may be determined across the one or more prejudicing variables through a multi-level Bayesian analysis.

In an embodiment, the AI model is built using historical data and the outcome of the model may be sent to a Bayesian bias detector for detecting bias in the AI model. The Bayesian bias detector may use output from the AI model's outcomes for the testing set to determine if the AI model is biased. This may be performed for each of the prejudicing variables. The Bayesian bias detector runs a multi-level Bayesian model to determine posterior estimates of a particular value of prejudicing variable being true, given that a customer or transaction has been flagged off as an anomaly by the AI model. In an embodiment, if there is insufficient or only a small amount of data for a particular value of the prejudicing variable, then values can be grouped such that there is sufficient data for each group. If only one value of the prejudicing variable is available, then the prejudicing variable may be dropped from further consideration. If the prejudicing variable has multiple possible values, then the ratio of the posterior estimate of the value of the prejudicing variable with the most likelihood of being flagged off is compared to the posterior estimate of the value of the prejudicing variable with the least likelihood of being flagged off. A prejudice may be detected, when the ratio exceeds a predefined threshold that is benchmarked for such anomalies. A multi-level analysis may be performed to detect prejudice at the level of country, department and individual agent or investigator who confirms the anomalies.

At step 306, the anomaly detection device 102 determines whether the feature set of the AI model includes any proxy variables associated with any of the prejudicing variables for which bias has been detected in the AI model by the Bayesian bias detector. The step 306 is performed for each feature of the AI model to determine if it is correlated with a prejudicing variable that is detected by the Bayesian Bias Detector in step 304. By way of an example, for an AI model trained to determine if promotion should be denied to an employee, one of the features in the AI model may be: "the number of leaves taken by an employee during a given year." In this case, though the AI model does not include gender as a feature, the quantum of leaves under maternity leave may result in biasing output of the AI model. In other words, the aforementioned feature may act as a proxy variable having a correlation with gender, a prejudicing variable resulting in biased predictions.

In response to determining that there is a proxy variable associated with a prejudicing variable for which bias has been detected by the Bayesian bias, the anomaly detection device 102, at step 308, identifies if the proxy variable has sufficient explanatory power independent of the prejudicing variable by building separate machine learning models for each cohort associated with each value of the prejudicing variable. Separate models are built only if the cohorts have sufficient data. If each of the cohort models have significantly better predictive power than the combined model and the feature sets of the two models are different, then it implies that the behavior of the two cohorts is different. The behavior of the larger cohort in these contexts might overwhelm the model thereby distorting the detection within the smaller cohort. In this instance, separate models are used for each cohort and the cohort models are checked for bias for any remaining prejudicing variables that have not been assessed. Prediction rates are normalized based on pre-determined values across the AI cohort models built for each of the plurality of cohorts. If all the cohorts have lower predictor power than the model that includes all cohorts, then the explanatory power of the proxy feature is assessed. If the effect of the proxy feature completely disappears when separate machine learning models are built for each cohort, then the proxy feature had no explanatory power of its own and the proxy feature can be dropped. However, if the potential proxy feature has some explanatory power even in the cohort level models, this implies that the feature has some discriminative power in determining anomalous individuals or transactions. The intra-cohort models are not affected by the prejudicing variable and therefore the residual explanatory power of the feature is independent of the prejudicing variable's effects. The intra-cohort feature weights are provided as outputs to the step 310.

Thereafter, the anomaly detection device 102 de-prejudices the feature set of the AI model at step 310. In order to de-prejudice the feature set, the anomaly detection device 102 drops proxy variables that have no explanatory power independent of associated prejudicing variables. In other words, one or more features from the feature set of the AI model may be dropped in case these features have no explanatory power independent of prejudicing variables. The anomaly detection device 102 re-assigns weights to proxy variables that have residual explanatory power beyond their correlation with prejudicing variables based on intra-cohort feature weights provided by step 308.

At step 312, the anomaly detection device 102 may de-prejudice the training data of any residual bias after de-prejudicing the feature set, through curation of the data set. In case the multi-level Bayesian analysis performed by the Bayesian bias detector in step 304 indicates that the prejudice is high but limited to particular agents and/or departments. In response to this indication, the training data is curated to exclude the data from the identified agents/departments. Agents and/or departments may be entities that are involved in investigating anomalies. The prejudice may be indicated by the ratio of posterior estimate of value of a prejudicing variable with the most likelihood of being flagged off to the posterior estimate of value of a prejudicing value with the least likelihood of being flagged off.

However, if there is no significant variation in the ratio across agents and/or departments, then the data is not excluded. In such cases, behavior variation across the plurality of cohorts might account for prejudiced AI models, since the behavior of the larger cohort overwhelms the model thereby distorting the prediction made for transactions or individuals of the smaller cohort. Therefore, when there is insufficient data to build separate AI models for each cohort, directed sampling techniques are used to build a de-prejudiced training set. Directed oversampling and directed under-sampling techniques may be used to normalize ratios across the cohorts based on pre-determined values.

In the directed oversampling strategy, the AI model over-samples non-anomalous cases for cohorts associated with a higher likelihood of being flagged. Alternately, the AI model may oversample anomalous cases where the value of a prejudiced variable is associated with a lower likelihood of being flagged. In the directed under-sampling strategy, the AI model may under-sample non-anomalous cases, where the value of a prejudicing variable is associated with a lower likelihood of being flagged. Alternately, the AI model may under-sample anomalous cases, where a value of a prejudiced variable is associated with a higher likelihood of being flagged. Thereafter, the technique that has the best precision and recall ratios is selected. The anomaly detection device 102 then builds the AI model on the curated data using the de-prejudiced feature set.

The AI model may be iteratively re-built multiple times through the de-prejudicing process. In other words, in response to determining the bias, the feature set used by the AI model and the training data may be iteratively de-prejudiced. In order to ensure that there is no overcorrection due to de-prejudicing the AI model, the Bayesian analysis is done for each of the one or more prejudicing variable at the end of the process of initial de-prejudicing. This ensures that outcomes of the re-built AI model do not have ratios that indicate any reverse prejudice.

Figure 4:
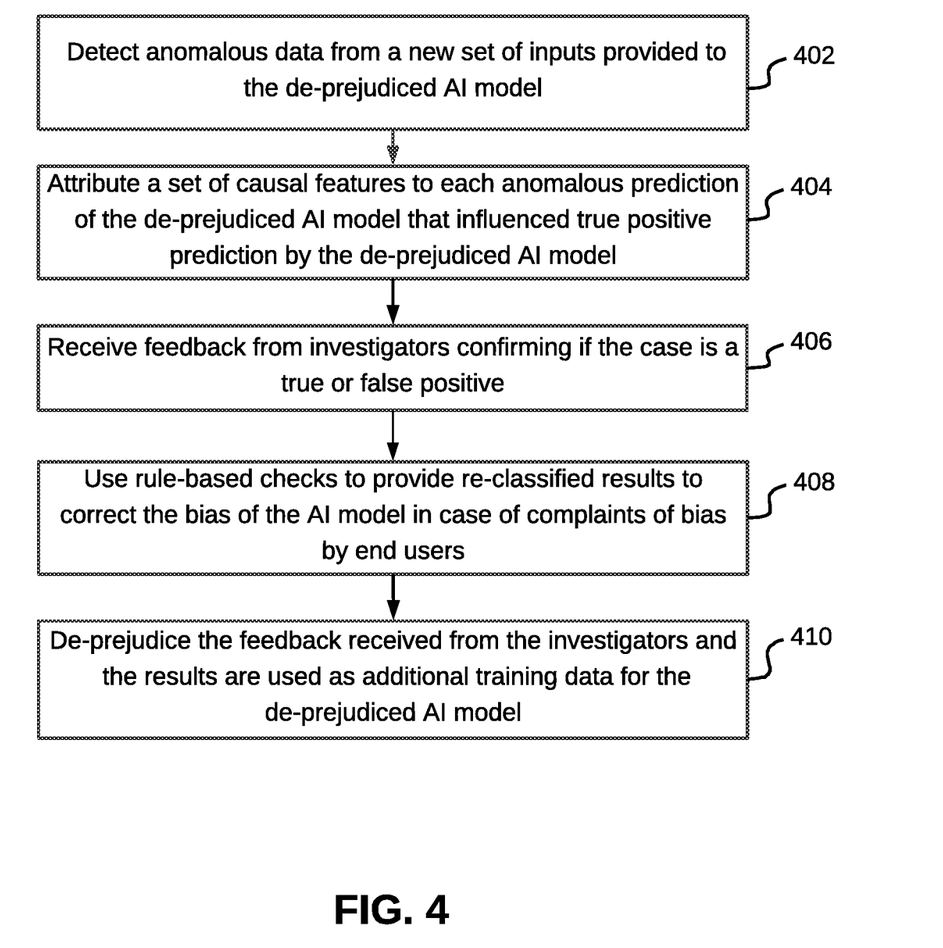
FIG. 4 illustrates a flowchart of a method to retrain the AI model based on feedback, in accordance with an embodiment.

Referring now to FIG. 4, a flowchart of a method to use and to retrain the AI model based on feedback is illustrated, in accordance with an embodiment. At step 402, the de-prejudiced AI model may detect anomalous data from a new set of inputs provided to the de-prejudiced AI model. Once an anomaly has been identified by the de-prejudiced AI model based on data collected on a daily or weekly basis, the output of the de-prejudiced AI model, i.e., the prediction output is further processed as described below. At step 404, a set of causal features are attributed to each anomalous prediction of the de-prejudiced AI model i.e. the set of features that influenced the true positive prediction by the de-prejudiced AI model. At step 406, feedback is received from investigators confirming if the case is a true or false positive. Feedback is also received to refine the attribution for those cases confirmed by the investigators to be true positives. In an embodiment, each anomalous prediction of the de-prejudiced AI model is attributed to a set of features that are specific to the decision. As a result, investigators are able to scrutinize the features relevant to the prediction for a given individual or transaction. The investigators may confirm if the causal features provided by the de-prejudiced AI model are relevant to the prediction. The feedback may then be used for learning and to improve attribution results of the de-prejudiced AI model.

Thereafter, at step 408, a rule-based check is used as a redressal mechanism to provide re-classified results to correct the bias of the AI model in case of complaints of bias by end users. The rule-based check is used to confirm anomalies predicted by the de-prejudiced AI model and thus provides the end users with a redressal system. The re-classified results provides additional training data to the model. Further, at step 410, the feedback received from the investigator is de-prejudiced and the results are used as additional training data for the de-prejudiced AI model. This step enables the AI model to learn from the human-in-the-loop. In other words, when the investigator confirms, whether a case detected by the de-prejudiced AI model, are actual anomalies or not, the confirmation is fed back to the step 302 for re-building and de-prejudicing the model. The de-prejudiced model therefore remains free of bias despite continuous self-learning from the feedback of investigators.

Figure 5:
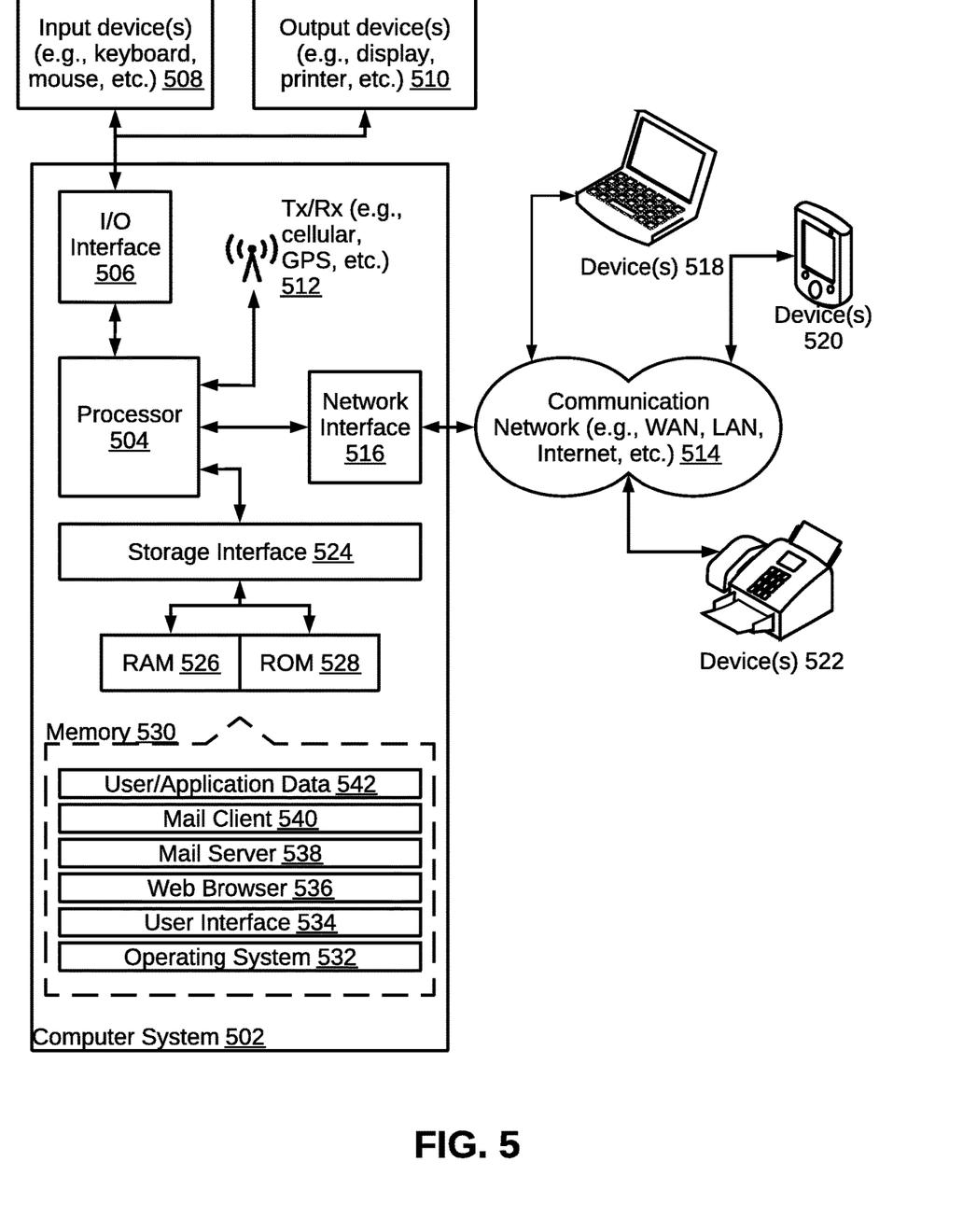
FIG. 5 illustrates a block diagram of an exemplary computer system for implementing various embodiments.

FIG. 5 is a block diagram of an exemplary computer system for implementing various embodiments. Computer system 502 may include a central processing unit ("CPU" or "processor") 504. Processor 504 may include at least one data processor for executing program components for executing user- or system-generated requests. A user may include a person, a person using a device such as such as those included in this disclosure, or such a device itself. Processor 504 may include specialized processing units such as integrated system (bus) controllers, memory management control units, floating point units, graphics processing units, digital signal processing units, etc. Processor 504 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 506. I/O interface 506 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 510 may be a printer, fax machine, video display (e.g., cathode ray tube (CRT), liquid crystal display (LCD), light-emitting diode (LED), plasma, or the like), audio speaker, etc. In some embodiments, a transceiver 512 may be disposed in connection with processor 504. Transceiver 512 may facilitate various types of wireless transmission or reception. For example, transceiver 512 may include an antenna operatively connected to a transceiver chip (e.g., TEXAS® INSTRUMENTS WIL-INK WL1283® transceiver, BROADCOM® BCM4550IUB8® transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 514 may include, without limitation, a direct interconnection, local area network (LAN), wide area network (WAN), wireless network (e.g., using Wireless Application Protocol), the Internet, etc. Using network interface 516 and communication network 514, computer system 502 may communicate with devices 518, 520, and 522. These devices may include, without limitation, personal computer(s), server(s), fax machines, printers, scanners, various mobile devices such as cellular telephones, smartphones (e.g., APPLE® PHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 502 may itself embody one or more of these devices.

In some embodiments, processor 504 may be disposed in communication with one or more memory devices (e.g., RAM 526, ROM 528, etc.) via a storage interface 524. Storage interface 524 may connect to memory 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 530 may store a collection of program or database components, including, without limitation, an operating system 532, user interface application 534, web browser 536, mail server 538, mail client 540, user/application data 542 (e.g., any data variables or data records discussed in this disclosure), etc. Operating system 532 may facilitate resource management and operation of computer system 502. Examples of operating systems 532 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 534 may facilitate display, execution, interaction, manipulation, or operation of program components through textual or graphical facilities. For example, user interfaces may provide computer interaction interface elements on a display system operatively connected to computer system 502, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 502 may implement a web browser 536 stored program component. Web browser 536 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 502 may implement a mail server 538 stored program component. Mail server 538 may be an Internet mail server such as MICROSOFT® EXCHANGE® mail server, or the like. Mail server 538 may utilize facilities such as ASP, ActiveX, ANSI C++/C #, MICROSOFT .NET® programming language, CGI scripts, JAVA® programming language, JAVASCRIPT® programming language, PERL® programming language, PHP® programming language, PYTHON® programming language, WebObjects, etc. Mail server 538 may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement a mail client 540 stored program component. Mail client 540 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 502 may store user/application data 542, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for de-prejudicing Artificial Intelligence (AI) based anomaly detection. The method automatically de-prejudices both the features and data of the AI model for anomaly detection to ensure non-prejudiced decisioning. The method provides for iterative checks for prejudice to ensure that both implicit and explicit bias are reduced and eliminated. The method reduces human involvement in ensuring non-prejudiced decisioning, thereby ensuring reduction in cost of prediction. A transparent and ethical anomaly detection process is provided the device.

The specification has described the method and device for de-prejudicing AI based anomaly detection. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for de-prejudicing Artificial Intelligence (AI) based anomaly detection, the method comprising:

training and testing, by an anomaly detection device, an AI model based on labelled training data;

determining, by the anomaly detection device, whether the AI model reveals a bias, based on one or more prejudicing variables;

determining, by the anomaly detection device, whether a feature set of the AI model includes at least one proxy variable associated with at least one prejudicing variable from the one or more prejudicing variables;

building, by the anomaly detection device, AI cohort models for a plurality of cohorts associated with values of each of the one or more prejudicing variables, wherein each cohort model is a separate machine learning model performing prediction including at least one prejudicing variable;

identifying, by the anomaly detection device, intra-cohort variation in prediction within the plurality of cohorts, wherein the intra-cohort variation indicates behavioral differences within the plurality of cohorts;

determining, by the anomaly detection device, based on the intra-cohort variation, when an effect of the at least one proxy variable has not disappeared from predictions of the plurality of cohorts and the proxy variable has explanatory power independent of the at least one prejudicing variable, and when a weight of the at least one proxy variable is independent of the at least one prejudicing variable;

de-prejudicing, by the anomaly detection device, the feature set of the AI model based on determining that the effect of the proxy variable has disappeared from predictions in the plurality of cohorts or determining the proxy variable does not have any explanatory power independent of the prejudicing variables, wherein de-prejudicing the feature set comprises iteratively removing one or more proxy variables;

de-prejudicing the training data, by the anomaly detection device, of any residual bias after de-prejudicing the feature set, through curation of a data set based on sampling techniques, wherein de-prejudicing the training data comprises curating data by removing data received from one or more entities, wherein the one or more entities are determined by a multi-level Bayesian analysis to reveal bias levels; and curating the data based on sampling techniques to remove residual bias after de-prejudicing the feature set; and building the AI model on the curated data using the de-prejudiced feature set.

2. The method of claim 1 further comprising building the AI model based on historical data associated with a plurality of users.

3. The method of claim 1 further comprising:
determining the bias across the one or more prejudicing variables through a multi-level Bayesian analysis; and
iteratively de-prejudicing the feature set used by the AI model and de-prejudicing the training data in response to determining the bias.

4. The method of claim 1, wherein iteratively removing one or more proxy variables comprises iteratively removing one or more proxy variables having no explanatory power independent of the one or more prejudicing variables.

5. The method of claim 1, wherein de-prejudicing the feature set of the AI model comprises determining a weightage associated with one or more proxy variables having explanatory power independent of the one or more prejudicing variables.

6. The method of claim 1, wherein separate AI cohort models are retained for each of the plurality of cohorts of the one or more prejudicing variable based on a set of conditions comprising: availability of data, behavior of each of the plurality of cohorts is different based on different prediction features, and predictive power associated with each of the separate AI cohort model is higher than that of the AI model.

7. The method of claim 1 further comprising detecting, by a de-prejudiced AI model, data comprising at least one anomaly from a new set of inputs provided to the de-prejudiced AI model.

8. The method of claim 7 further comprising
attributing a set of causal features to each anomalous prediction of the de-prejudiced AI model that influenced a true positive prediction by the de-prejudiced AI model; and
receiving feedback from investigators to refine the attributed set of causal features.

9. The method of claim 8 further comprising:
using rule-based checks as a redressal mechanism to provide re-classified results to correct the bias of the de-prejudiced AI model; and
de-prejudicing the feedback received from the investigator, by the anomaly detection device, using the feedback as additional training data for the de-prejudiced AI model to learn from a human-in-the-loop.

10. An anomaly detection device for de-prejudicing Artificial Intelligence (AI) based anomaly detection, the system comprising:
a processor; and
a memory communicatively coupled to the processor, wherein the memory stores processor instructions, which, on execution, causes the processor to:
train and test an AI model, based on labelled training data;
determine whether the AI model reveals a bias, based on one or more prejudicing variables;
determine whether a feature set of the AI model includes at least one proxy variable associated with at least one prejudicing variable from the one or more prejudicing variables that are inducing bias;
build AI cohort models for a plurality of cohorts associated with values of each of the one or more prejudicing variables, wherein each cohort model is a separate machine learning model performing prediction including at least one prejudicing variable;
identify intra-cohort variation in prediction within the plurality of cohorts, wherein the intra-cohort variation indicates behavioral differences within the plurality of cohorts;
determine based on the intra-cohort variation, when an effect of the at least one proxy variable has not disappeared from predictions of the plurality of cohorts and the proxy variable has explanatory power independent of the at least one prejudicing variable, and when a weight of the at least one proxy variable is independent of the at least one prejudicing variable;
de-prejudice the feature set of the AI model based on determining that the effect of the proxy variable has disappeared from predictions in the plurality of cohorts or determining the proxy variable does not have any explanatory power independent of the prejudicing variables, wherein de-prejudicing the feature set comprises iteratively removing one or more proxy variables;
de-prejudice the training data, by the anomaly detection device, of any residual bias after de-prejudicing the feature set through curation of a data set using sampling techniques, wherein the training data is de-prejudiced by
curating data by removing data received from one or more entities, wherein the one or more entities are determined by a multi-level Bayesian analysis to reveal bias levels; and
curating the data based on sampling techniques to remove residual bias after de-prejudicing the feature set; and
build the AI model on the curated data using the de-prejudiced feature set.

11. The anomaly detection device of claim 10, wherein the processor is further configured to build the AI model based on historical data associated with a plurality of users.

12. The anomaly detection device of claim 10, wherein the processor instructions further cause the processor to:
determine the bias across the one or more prejudicing variables through a multi-level Bayesian analysis; and
iteratively de-prejudice the feature set used by the AI model and de-prejudice the training data in response to determining the bias.

13. The anomaly detection device of claim 10, wherein iteratively removing one or more proxy variables comprises iteratively removing one or more proxy variables having no explanatory power independent of the one or more prejudicing variables.

14. The anomaly detection device of claim 10, wherein de-prejudicing the AI model comprises determining a weightage associated with one or more proxy variables having explanatory power independent of the one or more prejudicing variables.

15. The anomaly detection device of claim 10, wherein the processor instructions are further configured to detect data comprising at least one anomaly from a new set of data provided to a de-prejudiced AI model.

16. The anomaly detection device of claim 15, wherein the processor instructions are further configured to:
attribute a set of causal features to each anomalous prediction of the de-prejudiced AI model that influenced true positive prediction by the de-prejudiced AI model; and
receive feedback from investigators to refine the attributed set of causal features.

17. The anomaly detection device of claim 16, wherein the processor instructions are further configured to:
use rule-based checks as a redressal mechanism to provide re-classified results to correct the bias of the de-prejudiced AI model; and
de-prejudice the feedback received from the investigator, by the anomaly detection device, using the feedback to be used as additional training data for the de-prejudiced AI model to learn from a human-in-the-loop.

\* \* \* \* \*